United States Patent Office 3,810,751
Patented May 14, 1974

3,810,751
HERBICIDAL COMPOSITION OF A PYRIDAZONE DERIVATIVE AND CARBAMOYL-OXY PHENYL METHYL CARBAMATE
Adolf Fischer, Mutterstadt, and Karl-Heinz Koenig and Franz Reicheneder, Ludwigshafen, Germany, assignors to Badische Anilin- & Soda-Fabrik Aktiengesellschaft, Ludwigshafen (Rhine), Germany
No Drawing. Continuation-in-part of abandoned application Ser. No. 695,328, Jan. 3, 1968. This application May 18, 1970, Ser. No. 38,589
Int. Cl. A01n 9/22
U.S. Cl. 71—92      1 Claim

ABSTRACT OF THE DISCLOSURE

A composition comprising 1-phenyl-4-amino-5-halopyridazone-(6) and 3-(3'-methylphenylcarbamoyl)-oxy phenyl methyl carbamate. The composition has a strong herbicidal action on weeds but does not injure crop plants.

---

This application is a continuation-in-part of U.S. application No. 695,328 filed on Jan. 3, 1968, and now abandoned by Adolf Fischer, Karl-Heinz Koenig and Franz Reicheneder.

The present invention relates to composition comprising a substituted hydroxyphenyl carbamate and a pyridazone derivative. In particular it relates to compositions comprising carbamoylhydroxyphenyl carbamate and a substituted pyridazone derivative.

It is known that pyridazone derivatives, e.g. 1-phenyl-4-amino-5-chloropyridazone-6 (U.S. patent specification Nos. 3,210,353 and 3,222,159) may be used as herbicides both pre- and postemergence, e.g. in Indian corn, cereals, rice and beets. The action of these pyridazone derivatives is closely related to the climatic conditions during and after application. For example severe drought reduces the effectiveness of these pyridazone derivatives to a minimum.

An object of the present invention is to provide new compositions comprising a carbamoylhydroxyphenyl carbamate and a substituted pyridazone derivative. Another object of the invention is to provide a method of combating unwanted plants using these compositions, whereby only the unwanted plants are injured and the crop plants continue to grow normally.

These and other objects of the invention are achieved with a composition comprising
(a) a compound having the formula

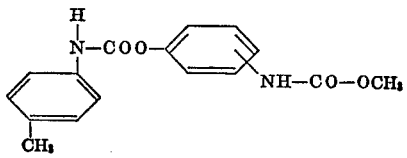

(b) a pyridazone derivative having the formula

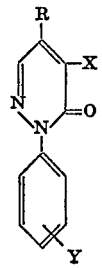

in which X denotes chlorine or bromine, Y denotes hydrogen and R denotes an amino group or one of the following groups NH—CHOH—CCl₃
NH—CO—COOH and the organic amine salts of this acid.

The compositions according to the present invention have an excellent herbicidal action especially in dry weather.

The weight ratio of Compounds a and b in the composition may vary within very wide margins. The preferred weight ratio of a:b is 1:3 to 1:1, in particular 1:1.

Compound a has a melting point of 133 to 134° C.

The compositions for regulating plant growth according to this invention may be used as solutions, emulsions, suspensions or dusts. The form of application depends entirely on the purpose for which the compositions are being used; in any case it should ensure a fine distribution of the active ingredients.

For the preparation of solutions to be sprayed direct, mineral oil fractions with medium to high boiling points such as kerosene or diesel oil, coal-tar oils and oils of vegetable and animal origin, cyclic hydrocarbons, such as tetrahydronaphthalene, and alkylated naphthalenes are suitable.

Aqueous formulations may be prepared from emulsion concentrates, pastes or wettable powders (spray powders) by adding water. To prepare emulsions the ingredients as such or dissolved in a solvent may be homogenized in water by means of wetting or dispersing agents. Concentrates which are suitable for dilution with water may be prepared from active ingredients, emulsifying or dispersing agent and possibly solvent. The compositions may also be applied as granulates.

The compositions may be added to insecticides, fungicides, bactericides and other herbicides or mixed with fertilizers.

Dusts may be prepared by mixing or grinding the active ingredients with a solid carrier.

The following example illustrate the application of the compositions according to this invention.

EXAMPLE

An agricultural area with several plots each 2 meters square was treated at a growth height of the plants *Beta vulgaris, Chenopodium album, Matricaria chamomilla, Amarantus retroflexus* and *Poa annua* of 4–7 cm. during a fortnight of continuous dry weather with the following individual active ingredients and mixtures of them, each dispersed or emulsified in 500 liter of water per hectare.

(I) Dimethylaminoethanol N-[1-phenyl-5-bromopyridazon-6-yl-(4)]-oxamate, 1.5 kg./ha.
(II) 1-phenyl-4-(α-hydroxy-β-β-β-trichloroethylamino)-5-bromopyridazone-(6), 2 kg./ha.
(III) 1-phenyl-4-amino-5-chloropyridazone-(6), 2 kg./ha.
(IV) 3-(N-3'-methylphenylcarbamoyloxy)-phenylmethyl carbamate, 1.5 and 2 kg./ha.
(I+IV) 1+0.5 kg./ha.
(II+IV) 1+1 kg./ha.
(III+IV) 1.5+1.5 kg./ha.

It was observed after 7–10 days that, compared with the individual components, the mixtures had a stronger herbicidal action and superior compatibility with *Beta vulgaris*.

The mean result of 5 experiments may be seen from the following table.

| Kg./ha. of active Ingredient | I<br>1.5 | II<br>2 | III<br>2 | IV<br>1.5 | IV<br>2 | I+IV<br>1+0.5 | II+IV<br>1+1 | III+IV<br>1.5+0.5 |
|---|---|---|---|---|---|---|---|---|
| *Beta vulgaris* | 0 | 12 | 0 | 13 | 17 | 0 | 5 | 0 |
| *Chenopodium alb* | 41 | 41 | 26 | 26 | 45 | 95.8 | 100 | 92.5 |
| *Matricaria cham* | 31.5 | 37.6 | 29 | 28 | 34 | 97 | 99.5 | 90 |
| *Amaranthus retr* | 40 | 51.5 | 31 | 15 | 18.5 | 78 | 83.5 | 70 |
| *Poa annua* | 40 | 44 | 35 | 15 | 20 | 80 | 89 | 77 |

NOTE.—0 = No damage; 100 = Complete destruction.

We claim:

1. A herbicidal composition consisting essentially of (a) 1-phenyl-4-amino-5-chloropyridazone-(6) and (b) 3-(3'-methylphenylcarbamoyl) - oxyphenylmethyl carbamate wherein the weight ratio of (a) to (b) is from 1:3 to 1:1.

References Cited

UNITED STATES PATENTS

| 3,404,975 | 10/1968 | Wilson et al. | 71—100 |
| 3,210,353 | 10/1965 | Reicheneder et al. | 260—250 |
| 3,287,105 | 11/1966 | Reicheneder et al. | 71—92 |
| 3,336,130 | 8/1967 | Fischer et al. | 71—92 |

FOREIGN PATENTS

| 660463 | 10/1966 | Netherlands | 77—111 |
| 1,382,499 | 11/1964 | France | 71—92 |
| 1,419,362 | 10/1965 | France | 71—92 |
| 1,558,512 | 1/1969 | France | 71—92 |

JAMES O. THOMAS, JR., Primary Examiner

U.S. Cl. X.R.

71—111

UNITED STATES PATENT AND TRADEMARK OFFICE
CERTIFICATE OF CORRECTION

PATENT NO. : 3,810,751
DATED : May 14, 1974
INVENTOR(S) : Adolf Fischer, Karl-Heinz Koenig & Franz Reicheneder It is certified that error appears in the above-identified patent and that said Letters Patent are hereby corrected as shown below:

In the heading, insert --Claims priority, Application German, January 10, 1967, B 90667 IVa/45 1--;

Column 1, line 31, delete "patent specification" and insert --Patent Specification--;

Column 4, line 5, delete "1:3" and insert --3:1--;

In the References, line 7, the patent number, delete "660463" and insert --6,604,363--.

Signed and Sealed this seventh Day of October 1975

[SEAL]

Attest:

RUTH C. MASON
Attesting Officer

C. MARSHALL DANN
Commissioner of Patents and Trademarks